United States Patent [19]
Twu et al.

[11] Patent Number: 6,100,360
[45] Date of Patent: Aug. 8, 2000

[54] PROCESS FOR PREPARING A POLYURETHANE ELASTIC FIBER

[75] Inventors: Yaw Kuo Twu, Changhua; Jaw hsiung Tsai, Taichung; Jing Xin Lin; Deng Hung Lee, both of Yunlin, all of Taiwan

[73] Assignee: Acelon Chemicals & Fiber Corporation, Chang Hua, Taiwan

[21] Appl. No.: 09/314,635

[22] Filed: May 19, 1999

[51] Int. Cl.$^7$ .......................... C08G 18/10; C08G 18/32; C08G 18/42; C08G 18/48; C08G 18/66

[52] U.S. Cl. .................. 528/66; 264/176.1; 264/211.23; 528/59; 528/65; 528/79; 528/80; 528/83; 528/503; 528/906

[58] Field of Search ............................ 264/176.1, 211.23; 528/80, 83, 503, 906, 65, 66, 59, 79

[56] References Cited

U.S. PATENT DOCUMENTS

| | | | |
|---|---|---|---|
| 3,664,979 | 5/1972 | Tanomura et al. | 528/83 |
| 4,791,187 | 12/1988 | Suling et al. | 528/60 |
| 4,871,818 | 10/1989 | Lodoen | 525/440 |
| 5,118,780 | 6/1992 | Hirai et al. | 528/83 |
| 5,290,905 | 3/1994 | Komiya et al. | 528/80 |
| 5,310,852 | 5/1994 | Hirai et al. | 528/83 |
| 5,565,270 | 10/1996 | Rehbold et al. | 428/364 |
| 5,606,005 | 2/1997 | Oshita et al. | 528/83 |
| 5,688,890 | 11/1997 | Ishiguro et al. | 528/51 |

*Primary Examiner*—Rabon Sergent
*Attorney, Agent, or Firm*—Bacon & Thomas

[57] ABSTRACT

A polyurethane elastic fiber is prepared from a polyurethane prepolymer by reaction extruding the polyurethane prepolymer and a chain extender, preferably with twin-screw extruder, and melt spinning the resulting polyurethane elastomer from the extrusion. The polyurethane prepolymer is obtained by carrying out a pre-polymerization reaction of a polyester diol and a diisocyanate, wherein the polyester diol comprises two different types of polyol, the first type being poly(tetramethylene adipate) glycol or poly($\epsilon$-caprolactone) glycol and the second type being a reaction product of a diol and dicarboxylic acid having 36 carbon atoms.

10 Claims, 4 Drawing Sheets

PROCESS FOR PREPARING A POLYURETHANE ELASTIC FIBER

FIELD OF THE INVENTION

The present invention is related to a process for manufacturing a polyurethane elastic fiber, and in particular to a continuous process for manufacturing a polyurethane elastic fiber by melt spinning a polyurethane elastomer.

BACKGROUND OF THE INVENTION

Polyurethane elastomer is one of the most popular thermoplastic elastomers, which is also referred as TPU. TPU not only possesses excellent thermoplastic processing workability, but also has an elasticity similar to rubber. Therefore, it can be utilized to manufacture many different articles, such as parts of sporting goods and electrical appliances, and fibers, by injection molding, compression molding, blow molding and extrusion.

The most commonly known conventional manufacturing process of the elastic fiber is the dry-type method of DuPont, which comprises the steps of: first, producing a composition of polyurethane (PU) elastomer; second, extruding an organic solution of the elastomer from a spinning orifice; and third, removing the organic solvent by blowing heated nitrogen to the extrudate to form the elastic fiber. The volatilization of the organic solvent such as dimethyl formamide (DMF) and dimethyl acetamide (DMAc) causes serious drawbacks of the above dry-type method, because the solvent vapor is very hazardous to human health and generates a great pollution to the environment. The manufacturer must invest a huge sum of money to recover the solvent; therefore the dry-type method unreasonably increases the production cost of the elastic fiber that adversely affects the marketing development and competition.

In recent years, Japanese companies developed a new technology to manufacture elastic fiber by melt spinning, such as Nisshinbo, Kanebo and Kuraray. The Japanese method is different from the above DuPont's method by eliminating the use of organic solvent, so that the manufacturing cost thereof is relatively lower than the DuPont's dry-type method. However, the raw material, polyurethane, has poor thermal properties. So that the physical properties of the polyurethane will be adversely affected after high temperature melt spinning. Furthermore, the elastic fiber has to be subjected to high temperature and hydrolysis conditions in finishing processes such as dyeing, so that the elastic fiber produced by the melt spinning method contains much more restraints in application and has lower physical properties than the elastic fiber made by the DuPont's dry-type method.

SUMMARY OF THE INVENTION

It is thus a primary object of the present invention to provide a continuous process for preparing a polyurethane elastic fiber.

The process for preparing polyurethane elastic fiber according to the present invention including preparing a polyurethane prepolymer by conducting a pre-polymerization reaction of a composition comprising a polyester diol and a diisocyanate; preparing a polyurethane elastomer by feeding said polyurethane prepolymer and a chain extender into a twin-screw extruder and reaction extruding said polyurethane prepolymer and said chain extender with said twin-screw extruder, wherein water, unreacted reactants and oligomers are removed during the extrusion by vacuuming; and melt spinning said polyurethane elastomer to form polyurethane elastic fiber.

Preferably, the process of the present invention further comprises drying the polyurethane elastomer prior to said melt spinning.

The present invention greatly improves the shortcomings of the conventional manufacturing processes of polyurethane elastic fiber and contains remarkable features as follows:

1. An unique formula used for preparing the polyurethane elastomer can provide the melt spun polyurethane elastic fiber with excellent thermal resistance, hydrolysis resistance and weather resistance.
2. A dicarboxylic acid having 36 carbon atoms, which is reacted with a diol to prepare a polyester diol used in the formula, constitutes parts of the soft segments of the polyurethane elastomer and thus enhances the thermal resistance and hydrolysis resistance of the polyurethane elastic fiber.
3. A chain extender used in the formula is an aromatic diol which can provide the polyurethane elastic fiber with enhanced thermal properties including an increased melting point.
4. The polyurethane elastic fiber prepared by a continuous process has a steady quality. Moreover, the proportion of the soft and hard segments of the polyurethane elastomer can be easily adjusted.

DETAILED DESCRIPTION OF THE INVENTION

Figure 1:
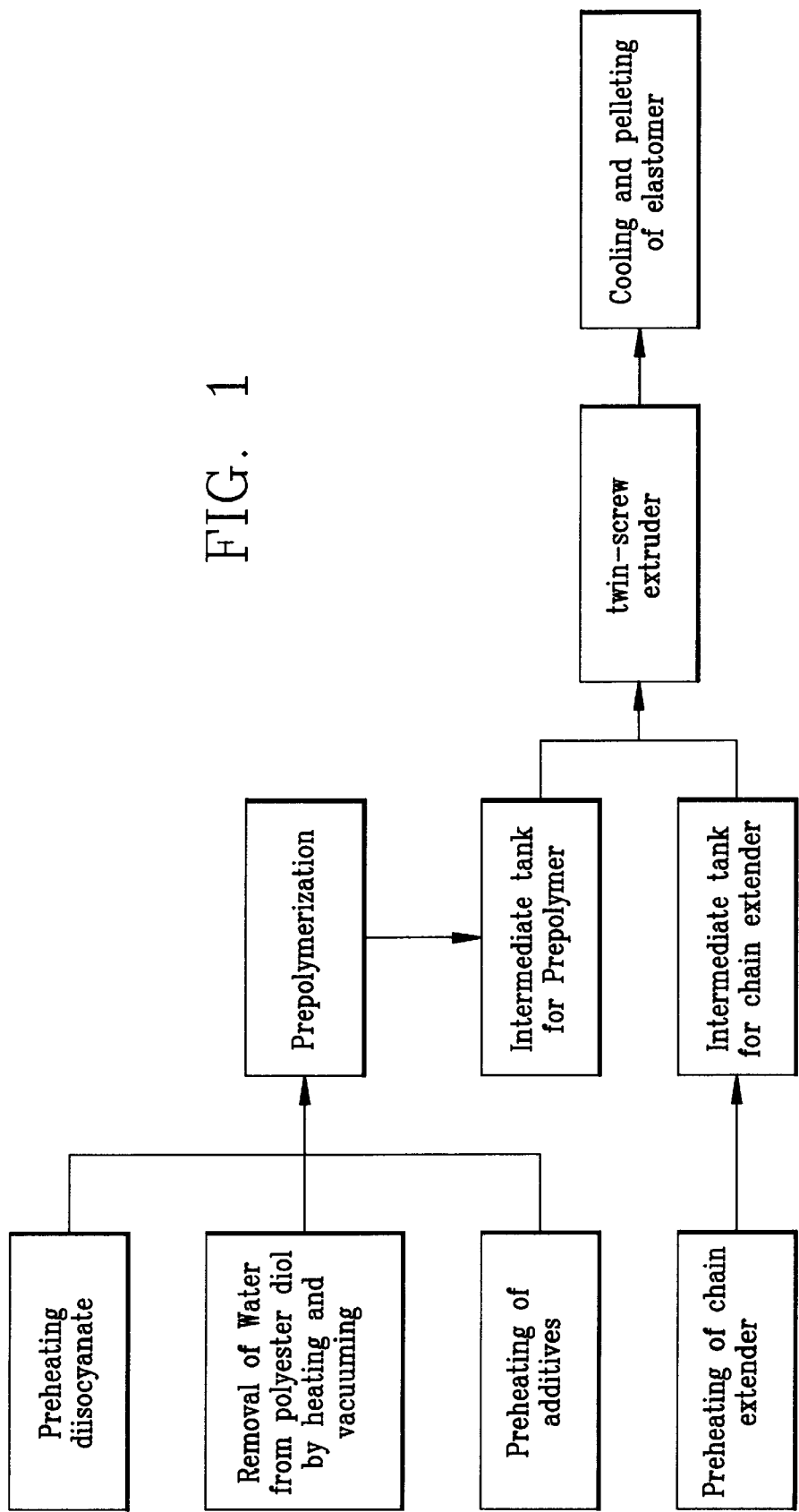
FIG. 1 is a block diagram showing a scheme for preparing polyurethane elastomer pellets according to the present invention.
Figure 2:
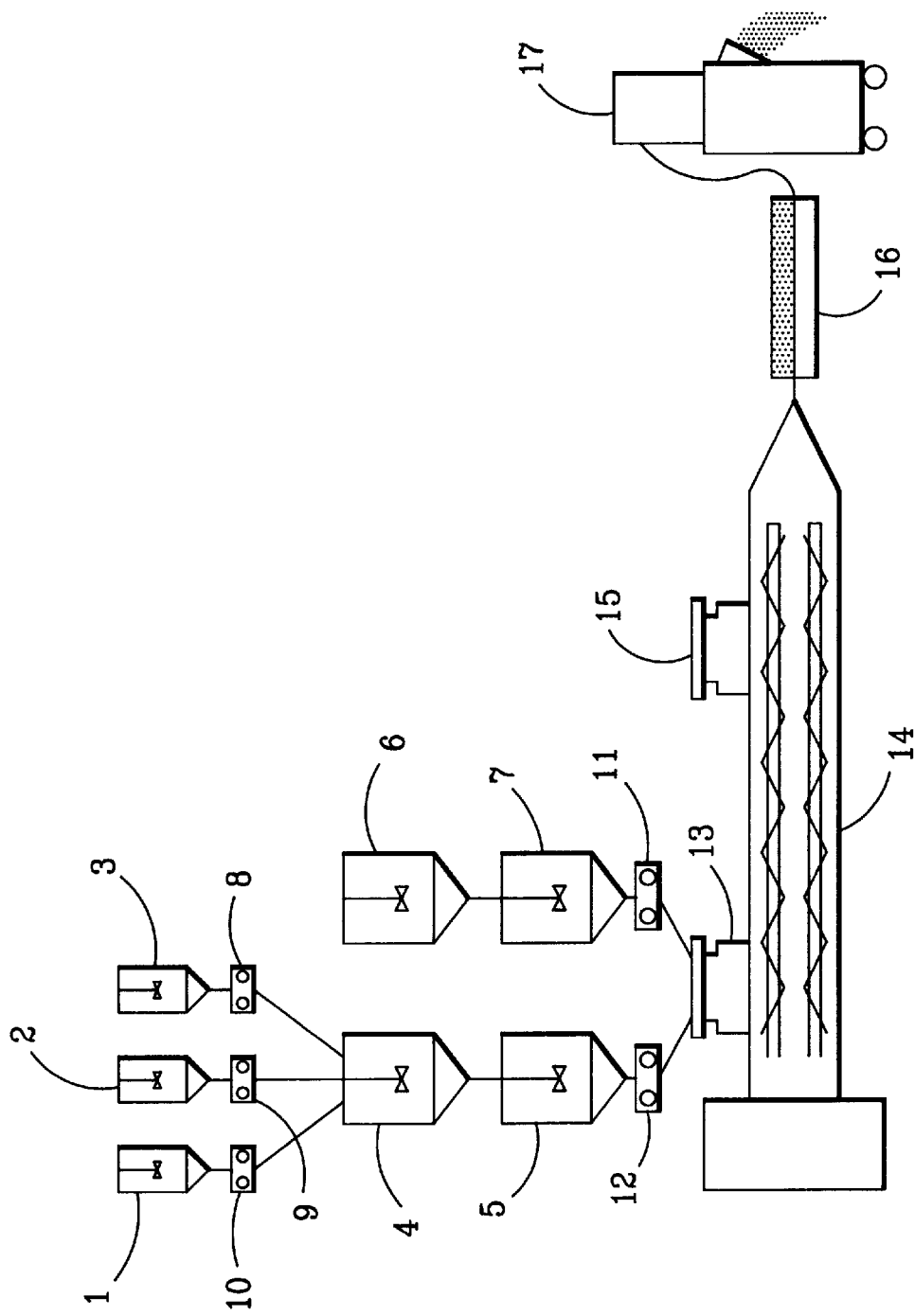
FIG. 2 is a schematic view showing an apparatus for preparing polyurethane elastomer pellets according to the present invention.

The present invention is directed to processes for preparing a polyurethane elastomer and an elastic fiber therefrom, which will be described in accompany with the drawings and step-by-step as follows:

A. Preheating of diisocyanate:

A suitable diisocyanate for use in the present invention is methylene bis(phenylisocyanate) (hereinafter abbreviated as MDI) having a purity of greater than 97% and melting point of 42–44° C. MDI, which is generally stored at 0°C., is melted in a preheating tank 1 before use by heating to a temperature of 50°C., as shown in FIGS. 1 and 2. The preheating of MDI is maintained at a temperature less than 65° C. and for a period less than 1 hour prior to pre-polymerization to avoid self-polymerization taking place.

B. Removal of water from polyester diol by heating and vacuuming:

There are two types (Type A and Type B) of polyester diols used in the present invention. Type A is poly(tetramethylene adipate)glycol or poly($\epsilon$-caprolactone) glycol. Type B is a reaction product of a diol (for example a C2–C4 diol) and dicarboxylic acid having 36 carbon atoms. The molecular weight of both type A and type B polyester diols is 500 g/mol~3000 g/mol. Type B polyester diol can provide the resulting polyurethane product with excellent high- and low-temperature stability, hydrolysis resistance, weather resistance and oxidation resistance, due to its long 36-carbon chain. The dicarboxylic acid having 36 carbon atoms can be represented by the following formula:

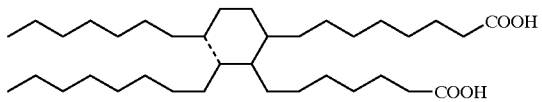

Type A and type B polyester diols are mixed with each other before reacting with the diisocyanate in the present invention. The molar ratio of the type A and type B polyester diols in the polyester diol mixture varies from 95:5 to 5:95, and is subject to change to meet the requirements of the market. Since the polyester diols absorb water inevitably, the removal of water therefrom has to be carried out before the pre-polymerization. The polyester diol mixture is first melted in a desiccating tank 2 and heated to a temperature higher than 100° C. under vacuum to remove the absorbed water.

C. Preheating of additives:

In order to facilitate the pre-polymerization reaction and to obtain the desired properties of the polyurethane product, a catalyst, a thermal stabilizer and anti-oxidation agent are added to the reaction mixture. The required additives are melted in an additive preheating tank 3.

D. Pre-polymerization

The diisocyanate, polyester diol, and additives are metered and introduced to a pre-polymerization tank 4 from the preheating tank 1, the dehydrate tank 2 and the additive preheating tank 3, respectively. The pre-polymerization reaction undergoes at a temperature of 60–80° C. for a period of 0.5–2 hours, while nitrogen gas is introduced to the pre-polymerization tank 4 to avoid oxidation taking place.

E. Intermediate tank for prepolymer

The resulting prepolymer from the pre-polymerization tank 4 is transferred to an intermediate tank 5, so that the pre-polymerization tank 4 is ready for the preparation of the next batch of prepolymer.

F. Preheating of chain extender

Suitable chain extenders for use in the present invention are diols, and preferably is a mixture of two types of diols, i.e. type A and type B. Type A diol is 1,4-butylene glycol, 1,6-hexylene glycol or 1,2-ethylene glycol. Type B diol has the following formula:

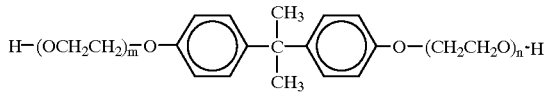

wherein m and n are integers of 1–5. The type B diol is an aromatic diol which can provide the polyurethane with good thermal properties. The molar ratio of type A and type B diols in the diol mixture ranges from 95:5 to 5:95, which is subject to change within the range according to the customers' demand. The diol mixture of the chain extender is well mixed in a chain extender preheating tank 6 while heating, and is maintained at 80° C.

G. Intermediate tank for chain extender

The well-mixed chain extender is transferred from the chain extender preheating tank 6 to an intermediate tank 7 where the chain extender is ready for use, so that the chain extender preheating tank 6 can be used for preparing the next batch of the chain extender.

H. Setting of twin-screw extruder

The polymerization of is conducted continuously in the present invention by using a twin-screw extruder 14, wherein the molar ratio of MDI and polyester, and the molar ratio of the pre-polymer and the chain extender are strictly controlled at pre-determined values via metering gear pumps 8, 9, 10, 11 and 12.

The molar ratio in the formula for preparing the polyurethane in the present invention is polyester diol: chain extender: MDI =1:1:2~1:10:11, wherein a basic rule is the moles of the sum of the polyester diol and the chain extender are equal to that of the MDI used. Moreover, the deviation of the molar ratio caused by the metering gear pumps 8, 9, 10, 11 and 12 is controlled within 1% to assure a polyurethane having a high molecular weight is form, and thus the problem of poor performance caused by low molecular weight can be prevented.

The prepolymer and the chain extender stored in the intermediate tanks 5 and 7 are fed at a pre-determined ratio via the metering gear pumps into an inlet 13 of the twin-screw extruder 14. The setting temperature of the twin-screw extruder 14 varies with different molar ratios of the formula, and ranges from 170° C. to 240° C. The reaction time is controlled by adjusting the rotation speed of the twin-screw extruder 14, and ranges from 1 to 10 minutes.

Gases generated in the reaction, for examples, $CO_2$ and $H_2O$, are withdrawn via a vacuuming outlet 15, so that the polymer exits from the twin-screw extruder is free of bubbles.

I. Cooling and pelleting of elastomer

The product exiting from the twin-screw extruder is immediately pulled through a cooling water tank 16, and the cooled product is cut into pellets with a cutter 17, whereby polyurethane elastomer having an unique formula, and excellent physical and chemical properties are produced.

J. Drying of elastomer

Figure 3:
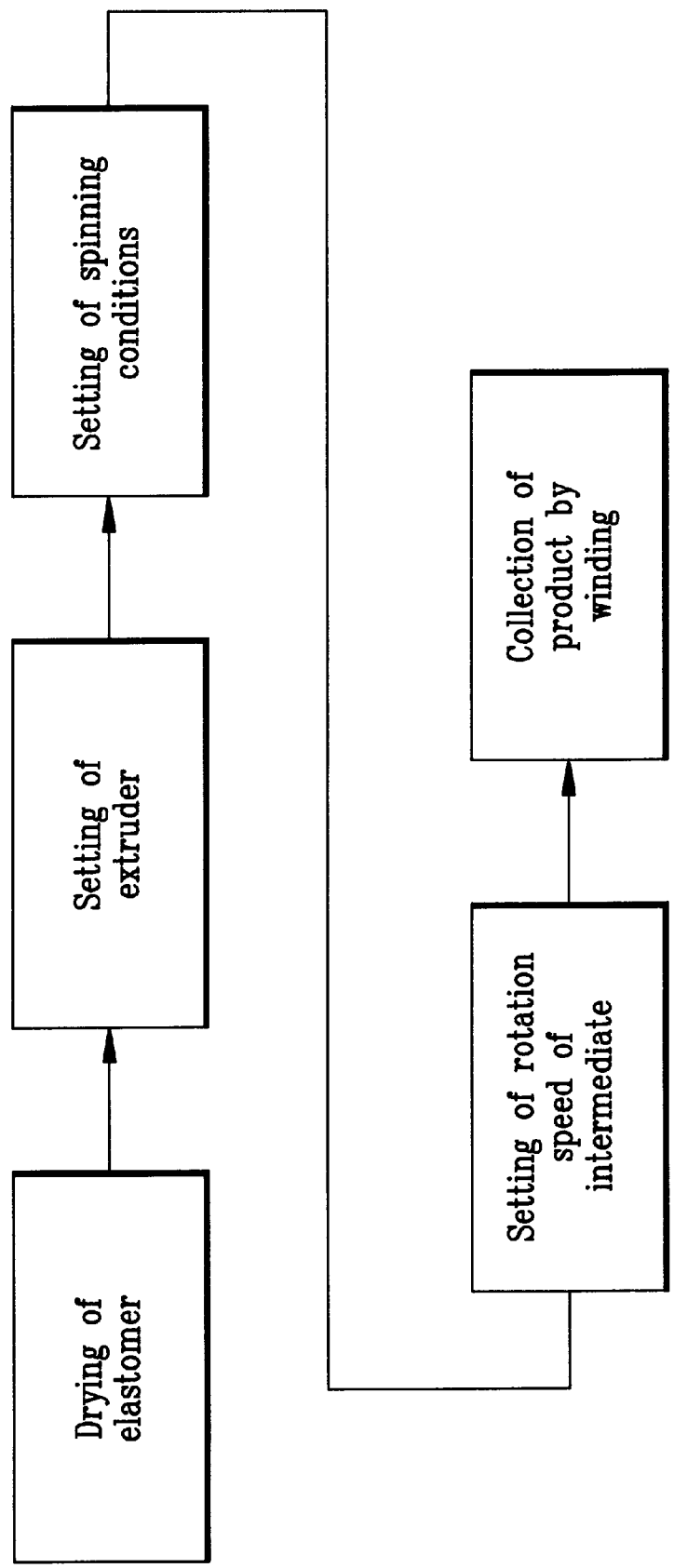
FIG. 3 is a block diagram showing a scheme for preparing polyurethane elastic fiber from the polyurethane elastomer pellets obtained in FIG. 1.
Figure 4:
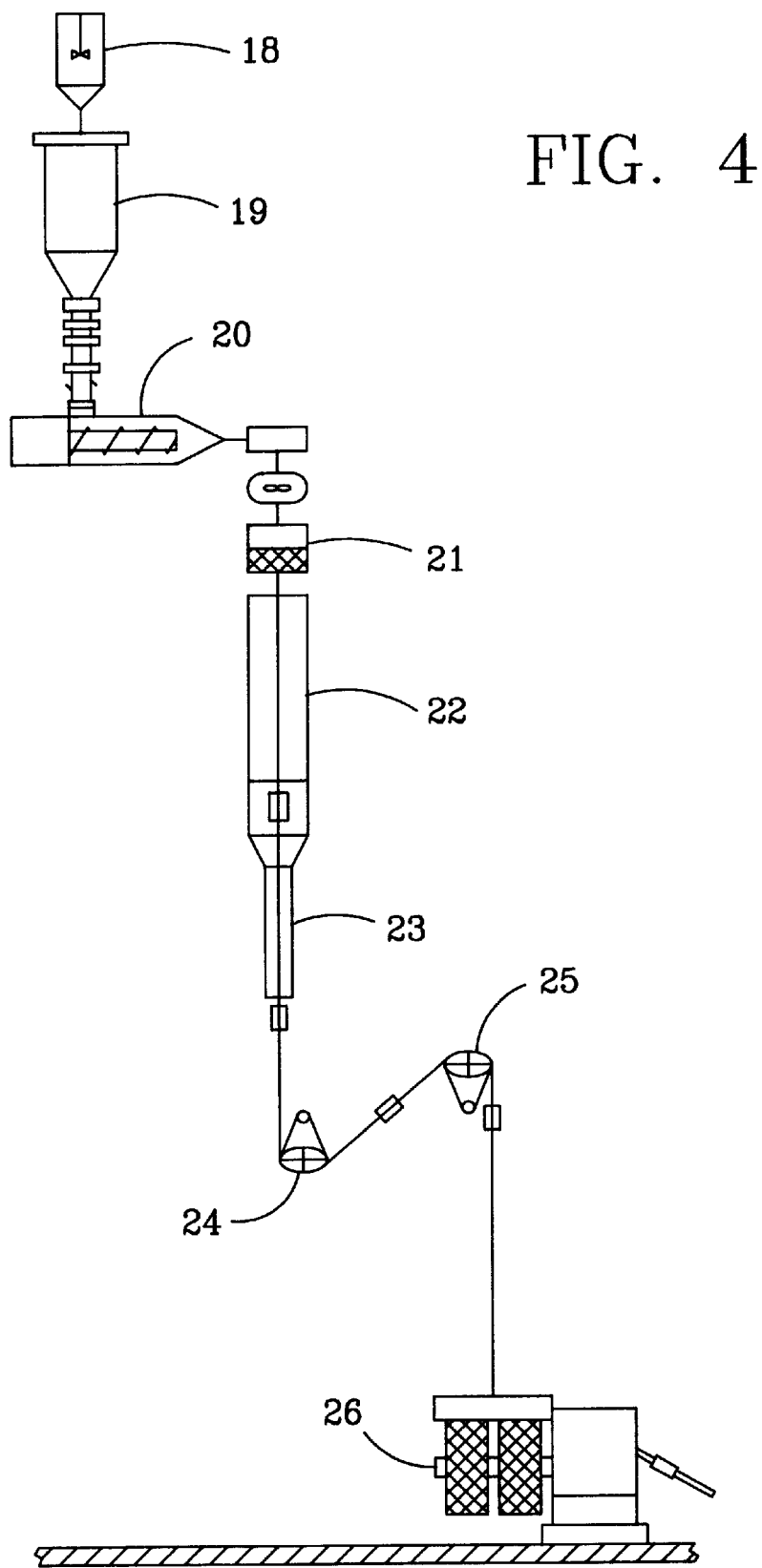
FIG. 4 is a schematic view showing an apparatus for preparing polyurethane elastic fiber from the polyurethane elastomer pellets obtained in FIG. 2.

Now refer to FIGS. 3 and 4. Since the glass transition temperature of polyurethane elastomer is lower than room temperature, the drying temperature can not be too high and is generally carried out by contacting the polyurethane elastomer with a hot dry air of 70° C.–100° C. which is obtained by heating an absolute dry air at its dew point –60° C. The hot dry air is introduced into a drying tank 18 where the polyurethane elastomer pellets are stirred, so that water can be blown away from the polyurethane elastomer pellets quickly. Moreover, the drying lasts for a period of 4–20 hours, causing the polyurethane elastomer to undergo a solid polymerization, and thus the polyurethane elastomer will have a molecular weight high enough to meet the spinning requirements. The dried polyurethane elastomer is transferred from drying tank 18 to an intermediate tank 19 connected to an extruder as a feeder.

K. Setting of the extruder

The melting point of the polyurethane elastomer from step J ranges from 165° C. to 200° C. depending on its composition. Accordingly, the temperature of an extruder 20 is set at 190° C.~230° C. Further, the pressure thereof is set at 50~200 Kg/cm², and the rotation speed thereof is set at 2~50 rpm. These settings of the extruder 20 are adjusted within the ranges according to the specification of the spun filaments. It is noted that the residence time of the polyurethane elastomer in the extruder 20 should be less than 15 minutes, preferably less than 5 minutes, to prevent the polyurethane elastomer from decomposition at high temperature.

L. Setting of the spinning condition

A spinning orifice assembly 21 is connected to the outlet of the extruder 20, which outputs molten polyurethane polymer into a cool fan device 22 followed by a spinning tube 23. The length of the spinning path is adjustable as required; however, the cooling fan device 22 should be able to provide the spinning path with 20° C.~25° C. cooling air.

M. Setting of the intermediate rollers

The ratio of rotation speeds between a first intermediate roller 24 and a second intermediate roller 25 ranges from 1:1 to 1:3. The stretch exerted by the rollers on the fiber will create an orientation effect on the polymer chains, and thus enhances the crystallinity and strength of the polyurethane elastic fiber.

N. Collection of product by winding

The polyurethane elastic fiber prepared in the present invention has a relatively higher viscosity and melting point, so that a high speed spinning can be used by setting a winder 26 at a winding speed of 1000~2000 m/min in comparison with the conventional winding speed of 300~500 m/min, and thus the yield can be increased and the cost can be reduced. Moreover, the polyurethane elastic fiber prepared in the present invention has improved physical and chemical properties.

It can be understood from above that the present invention first utilizes an unique formula to prepare high performance polyurethane elastomer, and then manufactures a polyurethane elastic fiber having improved physical and chemical properties therefrom with a significantly higher yield and reduced cost.

What is claimed is:

1. A process for preparing polyurethane elastic fiber comprising the following steps:

preparing a polyurethane prepolymer by conducting a pre-polymerization reaction of a composition comprising a polyester diol and a diisocyanate;

preparing a polyurethane elastomer by feeding said polyurethane prepolymer and a chain extender into a twin-screw extruder and reaction extruding said polyurethane prepolymer and said chain extender with said twin-screw extruder; and melt spinning said polyurethane elastomer to form polyurethane elastic fiber;

said process being carried out with the proviso that said polyester diol comprises two different types of diols, type A and type B, wherein type A is poly(tetramethylene adipate)glycol or poly(ε-caprolactone) glycol, and type B is a reaction product of a diol and dicarboxylic acid having 36 carbon atoms.

2. The process according to claim 1, wherein both type A and type B polyester diols have a molecular weight of 500 g/mol~3000 g/mol.

3. The process according to claim 1, wherein said dicarboxylic acid having 36 carbon atoms has the following formula:

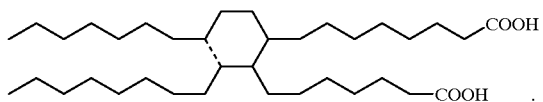

4. The process according to claim 1, wherein type A and type B polyester diols are mixed with each other before reacting with the diisocyanate and at a molar ratio of type A to type B polyester diols ranging from 95:5 to 5:95.

5. The process according to claim 1, wherein said pre-polymerization reaction undergoes at a temperature of 60–80° C. for a period of 0.5–2 hours under nitrogen gas atmosphere.

6. The process according to claim 1, wherein said polyester diol, said chain extender and said diisocyanate are used in accordance with a molar ratio of polyester diol: chain extender: diisocyanate=1:1:2~1:10:11, wherein the moles of the sum of the polyester diol and the chain extender used are equal to that of the diisocyanate used.

7. The process according to claim 1, wherein said chain extender is a mixture of two types of diols, type A' and type B', wherein type A' diol is 1,4-butylene glycol, 1,6-hexylene glycol or 1,2-ethylene glycol, and type B' diol is an aromatic diol having the following formula:

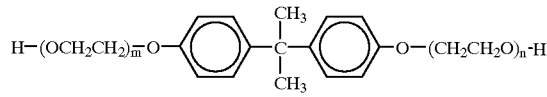

wherein m and n are integers of 1–5.

8. The process according to claim 7, wherein type A' and type B' diols are mixed at a molar ratio of type A' diol to type B' diol ranging from 95:5 to 5:95.

9. The process according to claim 1 further comprising drying the polyurethane elastomer prior to said melt spinning, wherein said drying is carried out by contacting the polyurethane elastomer with a hot dry air of 70° C.–100° C. for a period of 4–20 hours, causing the polyurethane elastomer to undergo further polymerization.

10. The process according to claim 3, wherein said type B diol is a reaction product of a diol having 2~4 carbon atoms and said dicarboxylic acid having 36 carbon atoms.

* * * * *